United States Patent
Ochs et al.

(10) Patent No.: US 7,074,950 B2
(45) Date of Patent: Jul. 11, 2006

(54) PROCESS FOR PREPARING ORGANOSILICON COMPOUNDS

(75) Inventors: Christian Ochs, Burghausen (DE); Christian Herzig, Waging (DE)

(73) Assignee: Wacker-Chemie GmbH, Munich (DE)

( * ) Notice: Subject to any disclaimer, the term of this patent is extended or adjusted under 35 U.S.C. 154(b) by 0 days.

(21) Appl. No.: 11/007,423

(22) Filed: Dec. 8, 2004

(65) Prior Publication Data

US 2005/0137412 A1    Jun. 23, 2005

(30) Foreign Application Priority Data

Dec. 18, 2003 (DE) ................... 103 59 589

(51) Int. Cl.
*C07F 7/04* (2006.01)
(52) U.S. Cl. ..................................... 556/445
(58) Field of Classification Search ............ 556/445
See application file for complete search history.

(56) References Cited

U.S. PATENT DOCUMENTS

| 4,431,789 A | 2/1984 | Okazaki et al. |
| 4,847,398 A | 7/1989 | Mehta et al. |
| 5,191,103 A | 3/1993 | Mehta et al. |
| 6,372,874 B1 | 4/2002 | Cameron |

FOREIGN PATENT DOCUMENTS

| EP | 0 277 023 A2 | 8/1988 |
| JP | 52093718 | 8/1977 |
| WO | WO 03/037961 A2 | 5/2003 |

OTHER PUBLICATIONS

Derwent Abstract corresponding to WO 03/037961 A2.

*Primary Examiner*—Samuel Barts
(74) *Attorney, Agent, or Firm*—Brooks Kushman P.C.

(57) ABSTRACT

The present invention relates to a process for adding Si-bonded hydrogen to aliphatically unsaturated compounds containing carbon-carbon multiple bonds and ether oxygen atoms in the presence of carbinol groups, wherein the reaction mixture comprises, as a further component, at least one cyclic ether.

14 Claims, No Drawings

PROCESS FOR PREPARING ORGANOSILICON COMPOUNDS

BACKGROUND OF THE INVENTION

1. Field of the Invention

The present invention relates to a process for preparing organosilicon compounds by hydrosilylation in the presence of a cyclic ether.

2. Background Art

The addition reaction of unsaturated organic compounds to SiH containing silanes or siloxanes in the presence of a hydrosilylation catalyst has been known for decades and is probably one of the most frequently utilized reaction steps for the synthesis of organofunctional silicon compounds. However, numerous investigations have shown that the hydrosilylation reaction proceeds smoothly and without the formation of by products only in certain cases. Typical side reactions when SiH, carbinol and unsaturated ether functions are present are, for example, dehydrocondensation and acetal formation, which often lead to undesired viscosity increases, up to gelling of the reaction mixture.

For the suppression of side reactions, the prior art discloses various approaches. While the use of basic inorganic compounds, for example alkali metal/alkaline earth metal carbonates, bicarbonates, borates, hydroxides and oxides and also $NaH_2PO_4$ and/or $Na_2HPO_4$ finds widespread application, U.S. Pat. Nos. 5,191,103 and 6,372,874 recommend the use of basic organic compounds in the form of (sterically hindered) amines or phosphines, and of alkylamines having OH, carbonyl or ether functionality. In contrast, U.S. Pat. Nos. 4,431,789 and 4,847,398 teach the addition of carboxylic acid salts as weak bases. A completely different approach is described by WO 2003037961 A2 and WO 2003037961 A1. In these publications, lactones, lactams and cyclic carbonates and carbamates are preferred as the hydrosilylation additive.

A disadvantage of the processes previously mentioned is that the additives used are for the most part solids which are insoluble in the silicone phase. Especially in a continuous reaction, for example, in loop reactors, tubular reactors or microreactors, this leads to problems, or makes the addition of organic solvents for homogenizing the reaction mixture indispensible. However, the latter constitute an additional disadvantage from an economic point of view, since the removal of the solvent on completion of reaction necessitates a further process step, for example distillation and filtration. It is also known that reactions take place in a heterogeneous system only on the particle surface, so that, to achieve the desired effect, additive amounts in the percent range are necessary.

However, the use of organic bases in the form of amines or phosphines is problematic in that they are known, even in very small amounts, to have an inhibiting action on the hydrosilylation reaction. Accordingly, when the abovementioned amine and phosphine systems are used, larger amounts of catalyst and higher reaction temperatures than usual are required. Incidentally, the situation is also similar for the carboxylic acid salts listed, which often lead to slowing of the hydrosilylation reaction and, in specific cases, even to a reduced selectivity. The most serious disadvantage of the additives specified in WO 2003037961 A2 and WO 2003037961 A1 is their generally poor compatibility with organosilicon compounds. For instance, especially cyclic carbonates and carbamates, and also lactams, are known to have only very sparing solubility in the silicone phase, so that it is necessary to use additive amounts of 1000 ppm and more.

There is therefore a need for a simple and inexpensive process which allows for synthesis of organofunctional organosilicon compounds by hydrosilylation reactions while generating very low levels of by-products.

SUMMARY OF THE INVENTION

The invention provides a process for adding Si bonded hydrogen to aliphatically unsaturated compounds containing both carbon-carbon multiple bond(s) and ether oxygen atom in the presence of carbinol groups, wherein the reaction mixture comprises, as a further component, at least one cyclic ether.

DETAILED DESCRIPTION OF THE PREFERRED EMBODIMENT(S)

The compounds having Si-bonded hydrogen (1) which are used in the process of the invention are preferably organosilicon compounds containing units of the formula $$R_a(R_1O)_bH_cSiO_{(4-a-b-c)/2} \qquad (I),$$

where

R independently are monovalent, SiC-bonded, optionally substituted hydrocarbon radicals optionally interrupted by oxygen atoms, $R^1$ independently are a hydrogen atom or a monovalent, optionally substituted hydrocarbon radical optionally interrupted by heteroatoms, a is 0, 1, 2 or 3, b is 0, 1, 2 or 3 and c is 0, 1, 2 or 3, preferably 0 or 1, with the proviso that the sum of a+b+c is $\leq 4$ and the organosilicon compound of the formula (I) has at least one Si-bonded hydrogen atom per molecule.

The organosilicon compounds used in the process according to the invention may be either silanes, i.e. compounds of the formula (I) where a+b+c=4, or siloxanes, i.e. compounds containing units of the formula (I) where a+b+c$\leq 3$, and the term polysiloxane in the context of the present invention is intended to encompass polymeric, oligomeric and also dimeric siloxanes. The organosilicon compounds used in the process according to the invention are preferably organopolysiloxanes, more preferably those which consist of units of the formula (I).

Examples of R are alkyl radicals such as the methyl, ethyl, n-propyl, isopropyl, 1-n-butyl, 2-n-butyl, isobutyl, tert-butyl, n-pentyl, isopentyl, neopentyl, and tert-pentyl radicals; hexyl radicals such as the n-hexyl radical; heptyl radicals such as the n-heptyl radical; octyl radicals such as the n-octyl radical and isooctyl radicals such as the 2,2,4-trimethylpentyl radical; nonyl radicals such as the n-nonyl radical; decyl radicals such as the n-decyl radical; dodecyl radicals such as the n-dodecyl radical, octadecyl radicals such as the n-octadecyl radical; cycloalkyl radicals such as the cyclopentyl, cyclohexyl, cycloheptyl, and methylcyclohexyl radicals; alkenyl radicals such as the vinyl, 1-propenyl and 2-propenyl radicals; aryl radicals such as the phenyl, naphthyl, anthryl and phenanthryl radicals; alkaryl radicals, such as o-, m-, p-tolyl radicals, xylyl radicals and ethylphenyl radicals; and aralkyl radicals such as the benzyl radical, and the α- and the β-phenylethyl radicals.

Examples of substituted R radicals are haloalkyl radicals such as the 3,3,3-trifluoro-n-propyl radical, the 2,2,2,2', 2', 2'-hexafluoroisopropyl radical, the heptafluoroisopropyl radical; and haloaryl radicals such as the o-, m- and p-chlorophenyl radicals, quat-functional radicals such as —(CH$_2$)$_3$—N(CH$_3$)$_3$$^+$ including the anions needed to compensate for the cationic charge; carbonyl-functional radicals, for example the propionaldehyde radical; polyalkylene oxide-functional radicals, for example polyethylene glycol radicals, polypropylene glycol radicals or mixed polyether radicals; hydroxy-functional radicals such as those of primary, secondary or tertiary alcohols, for example the 3-hydroxypropyl and 4-hydroxybutyl radicals, or such as those of aromatic alcohols, for example the phenol or eugenol radicals; carboxylic acid-functional radicals, especially the derivatives or salts thereof, such as the acetate, 3-carboxylatopropyl, 4-carboxylatobutyl, 10-carboxylatodecyl, 3-(2, 5-dioxotetrahydrofuranyl)propyl, 3-(ethane-1,2-dicarboxylato)propyl, 3-acryloyloxypropyl, 3-methacryloxypropyl, and undecenesilyl ester radicals; phosphonato-functional radicals, for example phosphonatoalkyl radicals; silalactone-functional radicals; and glycoside-functional radicals, for example those in which a glycoside radical which is formed from 1 to 10 monosaccharide units is bonded via an alkylene or oxyalkylene spacer.

The R radical is preferably selected from hydrocarbon radicals optionally substituted by halogen, groups containing quaternary nitrogen, carboxylate groups, anhydride groups and amide groups, all having from 1 to 18 carbon atoms, more preferably the methyl, ethyl, vinyl, n-propyl, n-octyl, n-dodecyl, n-octadecyl and phenyl radicals, especially the methyl and phenyl radicals.

If the inventive organosilicon compounds are organopolysiloxanes, at least 50%, more preferably at least 90% of all R radicals are methyl or phenyl radicals.

Examples of R$^1$ radicals are the examples recited for the R radical. The R$^1$ radical is preferably a hydrogen atom or an alkyl radical which has from 1 to 8 carbon atoms and is optionally be interrupted by ether oxygen atoms. Particular preference is given to the hydrogen atom, and the methyl, ethyl, propyl and butyl radicals.

The organosilicon compounds containing units of the formula (I) are preferably linear or branched organopolysiloxanes.

The component (1) may be liquid or solid, preferably liquid, at room temperature and the pressure of the surrounding atmosphere, i.e. from about 900 to 1100 hPa, and preferably has an average viscosity at 25° C. of from 1 to 1,000,000 mm 2/s, more preferably from 1 to 20,000 mm$^2$/s, and in particular, from 5 to 2000 mm$^2$/s. The component (1) preferably contains Si-bonded hydrogen in amounts of at least 0.01 percent by weight, more preferably from 0.02 to 1.66 percent by weight. Component (1) is a commercially available product or can be prepared by processes common in silicon chemistry.

The aliphatically unsaturated compounds (2) containing carbon-carbon multiple bond(s) and ether oxygen atom(s) which are used in accordance with the invention are preferably selected from aliphatically unsaturated, linear or branched ethers and aliphatically unsaturated, linear or branched ether carbinols, more preferably aliphatically terminally unsaturated ether carbinols, and the ethers and ether carbinols may be constituents of copolymers, for example those having organopolysiloxane blocks. The invention, the aliphatically terminally unsaturated compounds containing ether oxygen atoms and carbinol groups are those which bear one or more primary or secondary carbinol groups.

The aliphatically unsaturated compounds containing ether oxygen atoms and carbinol groups are more preferably A) alkenyl ethers of di- and polyols, such as 1,2-ethanediol monoallyl ether, diethylene glycol monoallyl ether, 1,3-propanediol monoallyl ether, 3-allyloxy-1,2-propanediol, 2,2-dimethyl-1,3-propanediol monoallyl ether, 2-(allyloxymethyl)-2-ethyl-1,3-propanediol, 2,2-bis(allyloxymethyl)-1-butanol, hexanetriol monoallyl ether, hexanetriol diallyl ether, pentaerythritol monoallyl ether, pentaerythritol diallyl ether and pentaerythritol triallyl ether, B) alkenyl ethers of polyoxyalkylenes of the formula

where R$^2$ is a mono- or divalent, aliphatically unsaturated organic radical having at least 2 carbon atoms, preferably

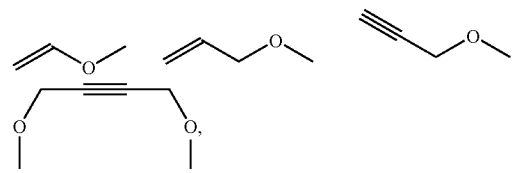

more preferably

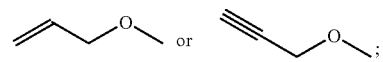

y, according to the valency of the R$^2$ radical, is 1 or 2; d, e, and f are each independently 0 or an integer of 1–200, preferably 0–100, more preferably 0–50, with the proviso that the sum of d+e+f is ≧1, for example vinyl or allyl ethers of polyethylene glycol, polypropylene glycol, poly(1,4-butanediol) and the copolymers thereof, and C) alkynyl ethers such as ethylene glycol monopropargyl ether and alkynyl ethers of polyoxyalkylene, for example butyne-1,4-diol ethoxylate. In the polyoxyalkylenes, the oxyalkylene groups may be distributed in any fashion, e.g. randomly, in blocks, in block/random form, etc.

The ethers without carbinol groups used in accordance with the invention are preferably

where

R$^3$ is as defined for R$^2$,

R$^4$ is a monovalent hydrocarbon radical having from 1 to 20 carbon atoms or an acetyl radical, preferably a methyl, 1-butyl, myristyl, cetyl, stearyl or acetyl radical, z, according to the valency of the R$^3$ radical, is 1 or 2, g, h, i are each independently 0 or an integer of 1–200, preferably 0–100, more preferably 0–50, with the proviso that the sum of g+h+i is ≧0 for example alkenyl ethers such as methyl vinyl ether, ethyl vinyl ether, methyl allyl ether and ethyl allyl ether, or alkynyl ethers such as propargyl alcohol methyl ether. The oxyalkylene groups may be distributed in any fashion.

The ethers without carbinol groups used in accordance with the invention are more preferably those compounds of the formula (III) in which the sum of g+h+i is ≧1 and $R^3$ is defined as

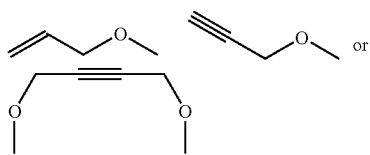

especially

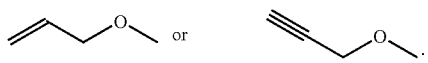

Component (2) is preferably an aliphatically unsaturated compound containing ether oxygen atoms and carbinol groups.

Aliphatically unsaturated compound(s) (2) are preferably used in amounts of from 0.001 to 5 mol, more preferably from 0.01 to 2 mol, based in each case on one mole of Si-bonded hydrogen. The component (2) may be liquid or solid at room temperature and the pressure of the surrounding atmosphere, and are commercial products or can be prepared by processes common in organic chemistry.

The process of the invention is carried out in the presence of carbinol groups, and the carbinol groups may be present in the aliphatically unsaturated compound (2) having ether oxygen atoms and/or in further, optionally added compounds (3) having carbinol groups.

In an optional but not preferred process variant, component (1) is reacted with an ether without carbinol groups as component (2) and compound (3) having carbinol groups, and the reaction mixture contains, as a further component, at least one cyclic ether and also optionally catalyst (5).

Examples of such optionally added compounds (3) having carbinol groups are alcohols such as methanol, ethanol, n-propanol, isopropanol, 1,2-propanediol, 1,3-propanediol, 1-butanol, 2-butanol, tert-butanol, 1,4-butanediol, 1-pentanol, 2-pentanol, 3-pentanol, 1,5-pentanediol, 1-hexanol, cyclohexanol, 1-heptanol, 1-octanol, 1-decanol, lauryl alcohol, myristyl alcohol, stearyl alcohol, benzyl alcohol, diethylene glycol, triethylene glycol, dipropylene glycol, ethylene glycol monomethyl ether, ethylene glycol monoethyl ether, ethylene glycol monobutyl ether, diethylene glycol monomethyl ether and diethylene glycol monobutyl ether, aliphatically saturated polyethers such as polyethylene glycol, polypropylene glycol, polyTHF and their copolymers, monomethyl, monoethyl and monobutyl ethers thereof, and also monoacyl esters of aliphatically saturated polyethers, and also organosilicon compounds having carbinol groups, such as those consisting of dimethylsiloxy, 3-hydroxypropylmethylsiloxy, 3-hydroxypropyldimethylsiloxy and/or trimethylsiloxy units or those consisting of dimethylsiloxy, trimethylsiloxy units and polyether blocks.

If compounds (3) having carbinol groups are used, they are preferably ethanol, n-propanol, isopropanol, 1,2-propanediol, 1,3-propanediol, 1-butanol, 2-butanol, 1,4-butanediol, diethylene glycol, ethylene glycol monomethyl ether, ethylene glycol monoethyl ether, ethylene glycol monobutyl ether, diethylene glycol monomethyl ether and diethylene glycol monobutyl ether, aliphatically saturated polyethers such as polyethylene glycol, polypropylene glycol, polyTHF and copolymers, monomethyl, monoethyl and monobutyl ethers thereof, and also monoacyl esters of aliphatically saturated polyethers, of which particular preference is given to isopropanol, 1,3-propanediol, 1-butanol, 1,4-butanediol, ethylene glycol monomethyl ether, ethylene glycol monobutyl ether, diethylene glycol monomethyl ether and diethylene glycol monobutyl ether.

If compounds (3) having carbinol groups are used, the amounts are preferably from 5 to 200 parts by weight, more preferably from 10 to 100 parts by weight, based in each case on 100 parts by weight of the total weight of components (1) and (2).

The cyclic ethers (4) may each independently be one or more saturated or unsaturated cyclic ethers, and the ethers may be monomers or part of polymers such as organopolysiloxanes, and are preferably compounds in which the ether cycle has from 3 to 10 ring atoms, more preferably from 3 to 8 ring atoms, in particular from 3 to 5 ring atoms. Component (4) is most preferably a saturated or unsaturated, optionally substituted hydrocarbon which contains one or more cyclic ethers.

Examples of saturated cyclic ethers used in the process according to the invention are ethylene oxide, propylene oxide, 1,2-epoxybutane, 2,3-epoxybutane, 2-methyl-1,2-epoxypropane, 2,3-epoxy-2-methylbutane, 1,2-epoxyhexane, 1,2-epoxyoctane, 1,2-epoxydecane, glycidol, isopropyl 2,3-epoxypropyl ether, butyl 2,3-epoxypropyl ether, 1,2,7,8-diepoxyoctane, 1,2,9,10-diepoxydecane, butadiene dioxide, limonene dioxide, caryophyllene dioxide, vinylcyclohexene dioxide, oxetane, tetrahydrofuran, 2,5-dihydrotetrahydrofuran, 2,5-dimethyltetrahydrofuran, tetrahydropyran, 1,3-dioxane, 1,4-dioxane, oxepane, methyl-1,2-cyclopentene oxide, 1,2-epoxycyclohexane, 1,4-epoxycyclohexane, 1,2-epoxycyclooctane, 1,2-epoxycyclodecane, 1,2-epoxycyclododecane, 1,2,4,5-diepoxycyclohexane, 1,2,5,6-diepoxycyclooctane, 2,3-epoxynorbornane and 1,8-cineole.

Examples of unsaturated cyclic ethers used in the process according to the invention are butadiene monoxide and mixtures thereof with butadiene diepoxide, 1,5-hexadiene monoxide, 1,7-octadiene monoxide, 1,9-decadiene monoxide, limonene oxide and mixtures thereof with limonene dioxide, caryophyllene oxide and mixtures thereof with caryophyllene dioxide, vinylcyclohexene oxide and mixtures thereof with vinylcyclohexene dioxide, allyl 2,3-epoxypropyl ether, 1,2-epoxy-9-decene, epoxystyrene, 2,3-epoxypropyl phenyl ether, 1,2-epoxy-1,2,3,4-tetrahydronaphthalene and 1,4-epoxy-1,2,3,4-tetrahydronaphthalene.

Component (4) is preferably isopropyl 2,3-epoxypropyl ether, butyl 2,3-epoxypropyl ether, phenyl 2,3-epoxypropyl ether, oxyethane, tetrahydrofuran, 2,5-dihydrotetrahydrofuran, 2,5-dimethyltetrahydrofuran, tetrahydropyran, 1,3-dioxane, 1,4-dioxane, oxetane, methyl-1,2-cyclopentene oxide, 1,2-epoxycyclohexane, 1,4-epoxycyclohexane, 1,2-epoxycyclooctane, 1,2-epoxycyclodecane, 1,2-epoxycyclododecane, 2,3-epoxynorbornane, 1,8-cineole, limonene oxide, caryophyllene oxide, vinylcyclohexene oxide, allyl-2,3-epoxypropyl ether, epoxystyrene, 1,2-epoxy-1,2,3,4-tetrahydronaphthalene and 1,4-epoxy-1,2,3,4-tetrahydronaphthalene, more preferably tetrahydrofuran, 1,2-epoxycyclohexane, limonene oxide, allyl 2,3-epoxypropyl ether and vinylcyclohexene oxide, most preferably tetrahydrofuran, 1,2-epoxycyclohexane, and limonene oxide.

Component (4) is preferably added in amounts of from 0.1 to 50,000 ppm by weight (parts by weight per million parts by weight), more preferably in amounts of from 0.1 to 25 000 ppm by weight, yet more preferably in amounts of from 1 to 10,000 ppm by weight and most preferably in amounts of from 10 to 1000 ppm by weight, based in each case on the total weight of components (1) and (2). Component(s) (4) are a commercial products or can be prepared by processes common in organic chemistry.

The process of the invention is preferably carried out in the presence of catalysts (5) which promote the addition of Si-bonded hydrogen to aliphatically unsaturated carbon-carbon multiple bonds. Examples of such catalysts (5) are all hydrosilylation catalysts, such as metallic and finely divided platinum which may be disposed on supports such as silica, alumina or activated carbon, compounds or complexes of platinum such as platinum halides, for example $H_2PtCl_6.6H_2O$, $PtCl_4$, $Na_2PtCl_4.4H_2O$, platinum-olefin complexes, platinum-alcohol complexes, platinum-alkoxide complexes, platinum-ether complexes, platinum-aldehyde complexes, platinum-ketone complexes, including reaction products of $H_2PtCl_6.6H_2O$ and cyclohexanone, platinum-vinylsiloxane complexes such as platinum-1,3-divinyl-1,1,3,3-tetramethyldisiloxane complexes with or without content of detectable inorganically bonded halogen, bis(γ-picoline)platinum dichloride, trimethylenedipyridineplatinum dichloride, dicyclopentadieneplatinum dichloride, dimethylsulfoxyethyleneplatinum (II) dichloride, and reaction products of platinum tetrachloride with olefins and primary amine or secondary amine or primary and secondary amine, such as the reaction product of platinum tetrachloride dissolved in 1-octene with sec-butylamine, and ammonium-platinum complexes.

Catalyst (5) is preferably a transition metal from group (VIII) of the Periodic Table or a compound or a complex of these transition metals, particularly preferred transition metals being from the group of the palladium or platinum metals. Especially preferred among these are platinum, palladium, rhodium and iridium, and the compounds and complexes thereof.

When catalyst (5) is used, the amounts are preferably from 0.1 to 200 ppm by weight, preferably from 1 to 50 ppm by weight, calculated in each case as elemental transition metal and based on the total weight of components (1) and (2).

In addition, it is possible to use all further substances (6) which have also been used hitherto in processes for adding Si-bonded hydrogen to aliphatic C—C multiple bonds. Examples of such further substances (6) are solvents, emulsifiers, phase transfer catalysts, preservatives, antimicrobial substances, for example bactericides, fungicides or algicides, odorants, odor-inhibiting or odor-reducing substances, defoamers, rheology controllers, dyes, pigments, redox stabilizers, flame retardants, light protectants and heat stabilizers. Over and above these, particular preference is given to using no further substances in the inventive process. For example, the process according to the invention may be carried out with or without solvent as a 1-phase or 2-phase reaction, or in dispersion, for example as micro- or macroemulsions.

Examples of suitable solvents which can be used in the process are pentane, petroleum ether, n-hexane, hexane isomer mixtures, cyclohexane, heptane, octane, petroleum benzine, decalin, benzene, toluene, xylene, isopropanol, butanol and isomers thereof, diethyl ether, di-n-propyl ether, diisopropyl ether, di-n-butyl ether, ethylene glycol monomethyl ether, ethylene glycol monoethyl ether, ethylene glycol dimethyl ether, ethylene glycol diethyl ether, diethylene glycol dimethyl ether, methyl acetate, ethyl acetate, n-, sec- and tert-butyl acetate, dichloromethane, trichloromethane, tetrachloromethane, 1,2-dichloroethane, trichloroethylene, tetrachloroethylene, chlorobenzene, linear and cyclic siloxanes and mixtures of the solvents mentioned.

When the process is carried out as a 2-phase reaction, it is necessary to ensure very good homogenization of the mutually immiscible phases and to provide a large reaction surface, for example by generating an average particle size of <500 μm. The intensive mixing of the reaction phases may in principle be effected with all prior art mixing systems, for example stirrers of any type, high-speed stirrers, for example those obtainable under the Ultra Turrax® brand or the like, dissolver systems, by means of ultrasound probes or baths, or, for example in the case of a continuous reaction, with static or mobile mixer elements.

When the process is carried out in dispersion, emulsifiers or surfactants, for instance nonionic, anionic, cationic or amphoteric emulsifiers, may appropriately be present, and the preparation of the dispersion may be effected in any manner known to those skilled in the art.

The component (6) used, when desired, is preferably a compatibilizing solvent, especially when component (1) and/or (2) are solids and/or mutually immiscible, liquid compounds, and may also be an emulsifier, especially when the process is carried out in a 2- or multiphase system. When further substances (6) are added, the amounts are preferably from 5 to 200 parts by weight, more preferably from 10 to 100 parts by weight, based in each case on 100 parts by weight of the total weight of components (1) and (2).

The components used in the process according to the invention may each be one type of such a component or else a mixture of at least two types of a particular component.

In the process of the invention, the components are mixed with one another in a manner known per se and allowed to react. The components may be mixed with one another in any sequence, added to the reaction and/or induced to react. In the case of a strongly exothermic reaction, preference is given to metering component (1) to a mixture consisting of components (2), (4) and (5), and also, if appropriate, (3) and/or (6). If further components (6) are substances which are known to complicate or inhibit the addition of Si-bonded hydrogen to aliphatically unsaturated carbon-carbon multiple bond, preference is given to adding these components after the end of the reaction.

The process according to the invention is preferably carried out at a pressure of the surrounding atmosphere, i.e. from about 900 to 1100 hPa, but it can also be carried out at higher and lower pressures, and is preferably carried out at a temperature of from 20 to 200° C., more preferably from 50 to 180° C. and most preferably from 60 to 130° C.

The process may be carried out batchwise, semicontinuously or fully continuously in reactor systems suitable therefor, for example batch reactors, batch reactor batteries, loop reactors, flow tubes, tubular reactors, microreactors, centrifugal pumps and any combinations thereof. On completion of the reaction, the reaction products obtained may be isolated by any suitable process steps, these being well known to the skilled artisan. If desired, volatile components and any solvent used may be removed by distillation after the reaction.

The process may additionally be followed by any further process steps, by means of which the desired properties of the organosilicon compound obtained by the process according to the invention can be adjusted in a selective manner. The performance of these additional process steps is in principle oriented to the prior art and proceeds in a manner known to those skilled in the art. Examples of such subsequent reactions are equilibration reactions with further organopolysiloxanes, condensation of the organosilicon compound(s), further organofunctional modification of the organosilicon compound(s), for example etherification, esterification, or urethane formation with isocyanates.

The process of the invention has the advantage that it is simple and inexpensive to carry out, and that it enables a fully homogeneous reaction as a result of the good compatibility of the cyclic ether components with the siloxane phase. The process additionally has the advantages that it can be used universally, is especially suitable for a continuous process, and that side reactions are fully eliminated even by small amounts of the cyclic ether components without the occurrence of the known disadvantages of the conventional additive systems, such as slowing or inhibition of the reaction, requiring large amounts of catalyst and relatively high temperatures, loss of selectivity, and presence of a heterogeneous reaction mixture.

In the examples described hereinbelow, all specifications of parts as percentages, unless stated otherwise, are based on weight. In addition, all viscosity data relate to a temperature of 20° C. Unless stated otherwise, the examples which follow are carried out at the pressure of the surrounding atmosphere, i.e. at about 1000 hPa, and at room temperature, i.e. at about 20° C., or at a temperature which is established when the reactants are combined at room temperature without additional heating or cooling.

EXAMPLE 1

0.46 g of a solution of hexachloroplatinic acid (0.48% Pt content) and 500 ppm of THF (0.22 g) are added to 204.0 g of ethylene glycol monoallyl ether. The clear homogeneous mixture is heated to 80° C., whereupon a total of 250.0 g of a linear siloxane consisting of dimethylsiloxy, hydromethylsiloxy and trimethylsiloxy units and having an active hydrogen content of 0.64% and a viscosity of 3.7 mm$^2$/s in the temperature range of 80–100° C. are metered in over a period of approx. 2 hours. After a further 2 hours at 90° C., a conversion of more than 99% has been achieved. The crude product is freed of volatile constituents in an oil pump vacuum at 130° C. and cooled. A brownish, clear, carbinolfunctional siloxane with an average of approximately four 2-hydroxyethoxypropyl groups per siloxane chain is obtained. The polymer viscosity is 389 mm$^2$/s at 25° C.

EXAMPLE 2

The procedure described in Example 1 is repeated with the modification that 500 ppm of THF are replaced by 0.22 g of cyclohexene oxide. After identical reaction and workup, a clear polymer having a viscosity of only 335 mm$^2$/s at 25° C. is obtained.

COMPARATIVE EXAMPLE 1

In accordance with the prior art, 2000 ppm of sodium hydrogencarbonate stabilizer are used instead of cyclohexene oxide. The insoluble salt has to be kept suspended by vigorous stirring. After reaction, filtration and removal of volatile constituents, a clear, brownish product having a viscosity of 868 mm$^2$/s at 25° C. is obtained. The NMR spectroscopy examination of the oil indicates significant amounts of acetal and SiOC-bonded fractions as the cause of the distinctly increased product viscosity in comparison to Example 2. NaHCO$_3$ is accordingly substantially less suitable for preventing the buildup of higher molecular weight products as a result of linking side and subsequent reactions.

EXAMPLE 3

The starting materials specified below are mixed homogeneously at 25° C.: 224.7 g of a polysiloxane consisting of dimethylsiloxy, hydromethylsiloxy and trimethylsiloxy units and having an active hydrogen content of 0.089% and a viscosity of 91 mm$^2$/s, 132.1 g of an allyl polyether of the average formula CH$_2$=CHCH$_2$O(C$_2$H$_4$O)$_{10.2}$H, and 0.18 g of limonene oxide (corresponding to 500 ppm). After heating to 100° C., 0.37 g of hexachloroplatinic acid solution (Pt content=0.48%) is added. In the course of rapid heating to 124° C., the reaction mixture clarifies. After a further hour at 100° C., 98% SiH conversion is achieved. The clear oil has a viscosity at 25° C. of 1590 mm$^2$/S. In the $^1$H NMR spectrum, no acetal proton (—O—CHR—O at 4.45 ppm) can be detected (detection limit: 0.2 mol %, based on 130 mol % of allyl raw material used).

COMPARATIVE EXAMPLE 2

Example 3 is carried repeated, but without limonene oxide as a stabilizer. A clear oil having considerably higher viscosity is obtained: 2086 mm$^2$/s at 25° C. The detectable acetal content is 1.1 mol %, based on 130 mol % of allyl raw material used.

EXAMPLE 4

0.45 g of solution of hexachloroplatinic acid (0.48% Pt content) and 500 ppm of cyclohexene oxide (0.109 g) are added to 153 g of an allyl polyether of the average formula CH$_2$=CHCH$_2$O(C$_2$H$_4$O)$_{10.6}$H. The clear, homogeneous mixture is heated to 110° C., whereupon a total of 65 g of a linear siloxane consisting of dimethylsiloxy, hydromethylsiloxy and trimethylsiloxy units and having an active hydrogen content of 0.31% and a viscosity of 39 nm$^2$/s in the temperature range of 110–115° C. are metered in over a period of approx. 0.5 hour. After a further 2.5 hours at 110° C., a conversion of more than 98% has been attained. The crude product is freed of volatile constituents in an oil pump vacuum at 130° C. and cooled. A golden, clear polyetherfunctional siloxane having an average of approx. 10 polyether groups per siloxane chain is obtained. The polymer viscosity is 1050 mm$^2$/s at 25° C. In the $^1$H NMR spectrum, no acetal proton can be detected (detection limit: 0.15 mol %, based on 130 mol % of allyl raw material used). In the $^{29}$Si NMR, there are no indications of SiOC-bonded D units (detection limit: 0.08%, based on the total number of D units per molecule).

COMPARATIVE EXAMPLE 3

Example 4 is repeated, but without cyclohexene oxide stabilizer. Even shortly after the complete addition of the siloxane to the polyether, complete gelling of the mixture occurs.

COMPARATIVE EXAMPLE 4

Example 4 is repeated, but using 500 ppm of sodium hydrogencarbonate stabilizer, and the solid is kept suspended by intensive stirring. After reaction, filtration and removal of volatile constituents, a brown oil having considerably higher viscosity is obtained: 4170 mm$^2$/s at 25° C.

The detectable acetal content is 34 mol %, based on 130 mol % of allyl raw material used. NaHCO$_3$ is accordingly several times less suitable for preventing the buildup of higher molecular weight products as a result of linking side and subsequent reactions.

COMPARATIVE EXAMPLE 5

Example 4 is repeated, but using 0.2% of sodium acetate stabilizer, and the solid is kept suspended by intensive stirring. After reaction, filtration and removal of volatile constituents, a brown oil having a viscosity of 1960 mm$^2$/s at 25° C. is obtained. The detectable acetal content is 1.95 mol %, based on 130 mol % of allyl raw material used. The detectable content of SiOC-bonded D units is 1.6%, based on the total number of D units per molecule.

COMPARATIVE EXAMPLE 6

Example 4 is repeated, but using 0.5% of disodium hydrogenphosphate dihydrate stabilizer, and the solid is kept suspended by intensive stirring. After reaction, filtration and removal of volatile constituents, a brown oil having a viscosity of 1760 mm$^2$/s at 25° C. is obtained. The detectable acetal content is 1.6 mol %, based on 130 mol % of allyl raw material used. The detectable content of SiOC-bonded D units is 1.4%, based on the total number of D units per molecule.

EXAMPLE 5

0.54 g of a solution of hexachloroplatinic acid (0.48% Pt content) and 250 ppm of vinylcyclohexene monoepoxide (0.064 g) are added to 55.7 g of ethylene glycol monoallyl ether. The clear homogeneous mixture is heated to 60° C., whereupon a total of 200 g of a linear siloxane consisting of dimethylsiloxy and hydrodimethylsiloxy units and having an active hydrogen content of 0.21% and a viscosity of 7.5 mm$^2$/s in the temperature range of 60–70° C. is metered in over a period of approx. 2 hours. After adding another 0.27 g of a solution of hexachloroplatinic acid (0.48% Pt content) and a further 2 hours of reaction time at 60° C., a conversion of more than 99% has been attained. The crude product is freed of volatile constituents in an oil pump vacuum at 140° C. and cooled. A brownish, clear carbinol-functional siloxane having two 2-hydroxyethoxypropyl groups per siloxane chain is obtained. The polymer viscosity is 285 mm$^2$/s at 25° C.

EXAMPLE 6

0.12 g of a solution of hexachloroplatinic acid (0.48% Pt content) and 500 ppm of limonene 1,2-epoxide (0.123 g) are added to 13.3 g of ethylene glycol monoallyl ether. The clear homogeneous mixture is heated to 80° C., whereupon a total of 200 g of a linear siloxane consisting of dimethylsiloxy and hydrodimethylsiloxy units and having an active hydrogen content of 0.052% and a viscosity of 57 mm$^2$/s in the temperature range of 80–85° C. is metered in over a period of approx. 2 h. After another 0.12 g of a solution of hexachloroplatinic acid (0.48% Pt content) has been added and a further 2 hours of reaction time at 80° C., a conversion of more then 98% has been attained. The crude product is freed of volatile constituents in an oil pump vacuum at 140° C. and cooled. A brownish, clear carbinol-functional siloxane having two 2-hydroxyethoxypropyl groups per siloxane chain is obtained. The polymer viscosity is 396 mm$^2$/s at 25° C.

EXAMPLE 7

2.84 g of a solution of hexachloroplatinic acid (0.48% Pt content) and 250 ppm of cyclohexene oxide (0.362 g) are added to 136.8 g of ethylene glycol monoallyl ether. The clear homogeneous mixture is heated at 60° C., whereupon a total of 1200 g of a linear siloxane consisting of dimethylsiloxy and hydromethylsiloxy and trimethylsiloxy units and having an active hydrogen content of 0.086% and a viscosity of 102 mm$^2$/s in the temperature range of 60–70° C. is metered in over a period of approx. 0.5 hour. After a further hour of reaction time at 60° C., a conversion of more than 99% has been attained. The crude product is freed of volatile constituents in an oil pump vacuum at 140° C. and cooled. A pale brown, clear carbinol-functional siloxane having an average of 4.5 2-hydroxyethoxypropyl groups per siloxane chain is obtained. The polymer viscosity is 248 Mm2/s at 25° C. Neither the $^1$H NMR nor the $^{29}$Si NMR spectrum of the product gives any indication of the formation of by-products as a result of linking side and subsequent reactions.

EXAMPLE 8

2.64 g of a solution of hexachloroplatinic acid (0.48% Pt content) and 250 ppm of cyclohexene oxide (0.337 g) are added to 43 g of ethylene glycol monoallyl ether. The clear homogeneous mixture is heated at 60° C., whereupon a total of 1200 g of a linear siloxane consisting of dimethylsiloxy and hydromethylsiloxy and trimethylsiloxy units and having an active hydrogen content of 0.027% and a viscosity of 425 mm$^2$/s in the temperature range of 60–70° C. is metered in over a period of approx. 0.5 hour. After a further hour of reaction time at 60° C., a conversion of more than 98% has been attained. The crude product is freed of volatile constituents in an oil pump vacuum at 140° C. and cooled. A pale brown, clear carbinol-functional siloxane having an average of 2.8 2-hydroxyethoxypropyl groups per siloxane chain is obtained. The polymer viscosity is 492 mm$^2$/s at 25° C. Neither the $^1$H NMR nor the $^{29}$Si NMR spectrum of the product gives any indication of the formation of by-products as a result of linking side and subsequent reactions.

EXAMPLE 9

The starting materials specified below are mixed homogeneously at 25° C.: 102 g of a linear siloxane consisting of dimethylsiloxy and hydrogendimethylsiloxy units and having an active hydrogen content of 0.21% and a viscosity of 6.5 mm$^2$/s, 500 ppm of cyclohexene oxide (0.068 g), 17.1 g of toluene and 17.4 g of allyl alcohol. After heating to 110° C., 0.29 g of a hexachloroplatinic acid solution (Pt content=0.48%) is added. After one hour of reaction time at 110° C., a further 0.145 g of hexachloroplatinic acid solution (Pt content=0.48%) is added and the mixture is left to stir at 110° C. After 2 hours, an SiH conversion of >99% is attained. The crude product is freed of volatile constituents in an oil pump vacuum at 110° C. and cooled. A golden, clear carbinol-functional siloxane having two 2-hydroxypropyl groups per siloxane chain is obtained. The polymer viscosity is 51 mm$^2$/s at 25° C.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A process for adding compound(s) (1) containing Si-bonded hydrogen to aliphatically unsaturated compound(s) (2) containing carbon-carbon multiple bond(s) and ether oxygen atoms, comprising reacting compounds (1) and (2) in the presence of carbinol groups, and in the presence of at least one cyclic ether (4), wherein said carbinol groups may be contained in a compound (2) or may be contained in compound(s) separately added.

2. The process of claim 1, wherein compounds having Si-bonded hydrogen (1) are organosilicon compounds containing units of the formula $$R_a(R^1O)_bH_cSiO_{(4-a-b-c)/2} \qquad (I)$$

where
R independently are a monovalent, SiC-bonded, optionally substituted hydrocarbon radicals optionally interrupted by non-adjacent oxygen atoms,
$R^1$ independently are a hydrogen atom or a monovalent, optionally substituted hydrocarbon radical optionally interrupted by heteroatoms,
a is 0, 1, 2 or 3,
b is 0, 1, 2 or 3 and
c is 0, 1, 2 or 3,
with the proviso that the sum of a+b+c is $\leq 4$ and the organosilicon compound of the formula (I) has at least one Si-bonded hydrogen atom per molecule.

3. The process of claim 1, wherein the compounds (2) containing aliphatically unsaturated carbon-carbon multiple bond(s) and ether oxygen atoms are selected from aliphatically unsaturated, linear or branched ethers and aliphatically unsaturated, linear or branched ether carbinols, wherein the ethers and ether carbinols may be a constituent of a copolymer.

4. The process of claim 1, wherein the aliphatically unsaturated compounds containing ether oxygen atoms also bear one or more primary or secondary carbinol groups, and are aliphatically terminally unsaturated.

5. The process of claim 1, wherein the aliphatically unsaturated compound (2) is used in an amount of from 0.001 to 5 mol, based on one mole of Si-bonded hydrogen.

6. The process of claim 1, wherein the aliphatically unsaturated compound (2) is used in an amount of from 0.01 to 2 mol, based on one mole of Si-bonded hydrogen.

7. The process of claim 1 wherein the cyclic ethers are compounds in which the cyclic ether has from 3 to 10 ring atoms.

8. The process of claim 1, wherein cyclic ether (4) is present in an amount of from 0.1 to 50,000 ppm by weight based on the total weight of components (1) and (2).

9. The process of claim 1, which is carried out in the presence of at least one catalyst (5) which promotes the addition of Si-bonded hydrogen to aliphatically unsaturated carbon-carbon multiple bond.

10. The process of claim 1, wherein aliphatically unsaturated compounds containing carbon-carbon multiple bond(s) and ether oxygen atoms of the formula $$R^3-\{[C_2H_4O]_g-[C_3H_6O]_h-[(CH_2)_4O]_i-R^4\}_z \qquad (III)$$

are employed, wherein
$R^3$ is as defined for $R^2$,
$R^4$ independently are monovalent hydrocarbon radicals having from 1 to 20 carbon atoms, or the acetyl radical,
z, according to the valency of the $R^3$ radical, is 1 or 2,
g, h, i are each independently 0 or an integer of 1–200, with the proviso that the sum of g+h+i is $\geq 0$.

11. The process of claim 10, wherein $R^4$ is selected from the group consisting of methyl, 1-butyl, myristyl, cetyl, stearyl, acetyl, and mixtures thereof.

12. The process of claim 1, wherein component (1) is reacted with at least one ether without carbinol groups as component (2), in the presence of a compound (3) having carbinol groups.

13. The process of claim 1, wherein at least one cyclic ether is selected from the group consisting of tetrahydrofuran, 1,2-epoxycyclohexane, limonene oxide, allyl 2,3-epoxypropyl ether and vinylcyclohexene oxide.

14. The process of claim 2, wherein at least one cyclic ether is selected from the group consisting of tetrahydrofuran, 1,2-epoxycyclohexane, limonene oxide, allyl 2,3-epoxypropyl ether and vinylcyclohexene oxide.

* * * * *